(12) United States Patent
Pedersen

(10) Patent No.: US 8,851,309 B2
(45) Date of Patent: Oct. 7, 2014

(54) METHOD OF CONDUCTING SERVICE ON A WIND TURBINE USING EQUIPMENT MOUNTED ON THE HUB

(75) Inventor: Bjarne Pedersen, Viby J (DK)

(73) Assignee: Vestas Wind System A/S, Aarhus N. (DK)

( * ) Notice: Subject to any disclaimer, the term of this patent is extended or adjusted under 35 U.S.C. 154(b) by 1421 days.

(21) Appl. No.: 10/573,643

(22) PCT Filed: Sep. 18, 2004

(86) PCT No.: PCT/DK2004/000635
§ 371 (c)(1),
(2), (4) Date: Feb. 28, 2007

(87) PCT Pub. No.: WO2005/031159
PCT Pub. Date: Apr. 7, 2005

(65) Prior Publication Data
US 2007/0273154 A1   Nov. 29, 2007

(30) Foreign Application Priority Data

Sep. 26, 2003 (DK) .................................. 2003 01401

(51) Int. Cl.
*B66C 23/02* (2006.01)
*B66C 23/20* (2006.01)
*F03D 1/00* (2006.01)

(52) U.S. Cl.
CPC .............. *B66C 23/027* (2013.01); *Y02E 10/726* (2013.01); *Y02E 10/728* (2013.01); *F05B 2240/916* (2013.01); *B66C 23/207* (2013.01); *F03D 1/003* (2013.01)
USPC ........................................... 212/223; 212/271

(58) Field of Classification Search
USPC ............... 29/402.09, 402.12, 402.14, 402.15, 29/402.03, 402.08, 897.33, 897.1; 212/223–253, 271; 414/814; 52/126.1
See application file for complete search history.

(56) References Cited

U.S. PATENT DOCUMENTS 3,989,059 A * 11/1976 Price et al. ..................... 137/347
4,002,243 A *  1/1977 Kramer ......................... 212/225

(Continued)

FOREIGN PATENT DOCUMENTS

DE      298 17 382       2/1999
DE      103 11 674       9/2004

(Continued)

OTHER PUBLICATIONS wo9610130.txt, an English language translation of document WO 96/10130 A1, cited on applicant's IDS filed Mar. 27, 2006.*

(Continued)

*Primary Examiner* — Jacob Cigna
(74) *Attorney, Agent, or Firm* — Wood, Herron & Evans, LLP

(57) ABSTRACT

The invention relates to a method for conducting service on a wind turbine after the wind turbine is erected and after the hub (1) of the wind turbine is mounted on the main shaft (3) of the wind turbine. The method comprises mounting of servicing equipment a crane (8) on the hub (1) of the wind turbine and lowering and hoisting wind turbine appliances from and to the hub. Thereby, it is possible to lower from and to lift to the hub, the appliances which is to be replaced or repaired without using the hatch constituting the escape way and without having to transfer the appliances through the nacelle and along the tower. The invention also relates to means (5, 6) for primarily securing the equipment to the hub of the wind turbine.

28 Claims, 10 Drawing Sheets

(56) References Cited

U.S. PATENT DOCUMENTS

| | | | |
|---|---|---|---|
| 4,582,205 A * | 4/1986 | Berger et al. | 212/175 |
| 5,427,356 A * | 6/1995 | Krotov et al. | 254/324 |
| 6,668,497 B1 * | 12/2003 | Mayer et al. | 52/126.1 |
| 7,521,083 B2 * | 4/2009 | Teichert | 427/140 |
| 2002/0112441 A1 * | 8/2002 | Bissen | 52/736.1 |

FOREIGN PATENT DOCUMENTS

| | | | |
|---|---|---|---|
| EP | 1 101 934 | | 5/2001 |
| EP | 1101934 A2 * | | 5/2001 |
| EP | 1677006 A2 * | | 7/2006 |
| NL | 1014553 C2 * | | 9/2001 |
| WO | WO 96/10130 | | 4/1996 |
| WO | WO 9610130 A1 * | | 4/1996 |
| WO | WO 01/94249 | | 12/2001 |
| WO | WO 03/048569 | | 6/2003 |
| WO | WO 03048569 A2 * | | 6/2003 |
| WO | WO 2004/067954 | | 8/2004 |

OTHER PUBLICATIONS

International Search Report; PCT/DK2004/000635; Jan. 12, 2005.

* cited by examiner

METHOD OF CONDUCTING SERVICE ON A WIND TURBINE USING EQUIPMENT MOUNTED ON THE HUB

FIELD OF THE INVENTION

The invention relates to a method for conducting service on a wind turbine after the wind turbine is erected and after the hub of the wind turbine is mounted on the main shaft of the wind turbine. The invention also relates to equipment for conducting such service and furthermore the invention relates to a connecting piece and a crane constituting part of the equipment. Finally, the invention relates to a wind turbine, to a hub and to uses of a hub.

BACKGROUND OF THE INVENTION

Although much of the appliances installed in a wind turbine is intended for lasting a very long time, some of the appliances must be replaced or must be repaired during the service life of the wind turbine. Equipment installed in the nacelle or in the tower of the wind turbine may be removed from or lifted to the nacelle by means of cranes or other lifting means provided on or in connection with the nacelle. The tower and the machine frame of the nacelle are solid structures where even large cranes may be secured to and where even heavy appliances may be lowered from or lifted to without any difficulties. However, appliances installed in the hub, in connection with the wings or in connection with the hub may be more difficult to access and to handle for possible removal in order for the appliances to be replaced or be repaired at a more suited location than the service location of the appliances. Often, a hatch is provided in the top of the nacelle housing, enabling access from or to the outside of the hub and from or to the nacelle and further down or up through the tower. This manner, in which appliances at the more remote locations mentioned is handled, is a secure manner, but also quite time-consuming. Also, during handling through the hatch of the nacelle housing, the escape way from the remote locations is blocked, endangering the working conditions at these remote locations.

SUMMARY OF THE INVENTION

It may be an object of the present invention to provide a method and equipment to be used by the method, and which does not posses the above-mentioned disadvantages.

This object is obtained by a method comprising mounting of servicing equipment on the hub of the wind turbine and lowering and hoisting wind turbine appliances from and to the hub. Thereby, it is possible to lower from and to lift to the hub, the appliances which is to be replaced or repaired without using the hatch constituting the escape way and without having to transfer the appliances through the nacelle and along the tower.

In a preferred embodiment the servicing equipment is mounted to the outside surface of the hub, and where the equipment to be lowered from and hoisted to the hub is lowered and hoisted to the hub at a front of the hub. Even more preferred, the servicing equipment is mounted by means of already available holes, said holes formerly used for hoisting the hub to the main shaft of the wind turbine. In a preferred embodiment, a connecting piece, preferably a collar of a connecting piece is provided with means for releasing adherence by the cement-like structure of the connecting piece to the hub.

By securing the servicing equipment to the surface of the hub and by furthermore utilising already available holes, it is very easy and fast to erect the servicing equipment and possible to lower or to hoist any equipment from the hub, the blades or the spinner without having to access the interior of the hub, i.e. all the already limited space inside the hub will not be occupied by the servicing equipment according to the invention.

Accordingly, the object of the invention is also obtained by equipment being provided with means for primarily securing the equipment to the hub opposite from securing the equipment to the nacelle or other parts, different from the hub, of the wind turbine.

The previously mentioned advantages, which are obtained by the method according to the invention, are fulfilled by means of the equipment according to the invention. Securing the equipment primarily to the hub avoids obstructing the hatch in the top of the nacelle, and makes it possible easily to handle appliances to and from the hub, the blades and the hub.

BRIEF DESCRIPTION OF THE DRAWINGS

In the following the wind turbine will be described with reference to the drawing, where.

DETAILED DESCRIPTION OF THE INVENTION

Figure 1:
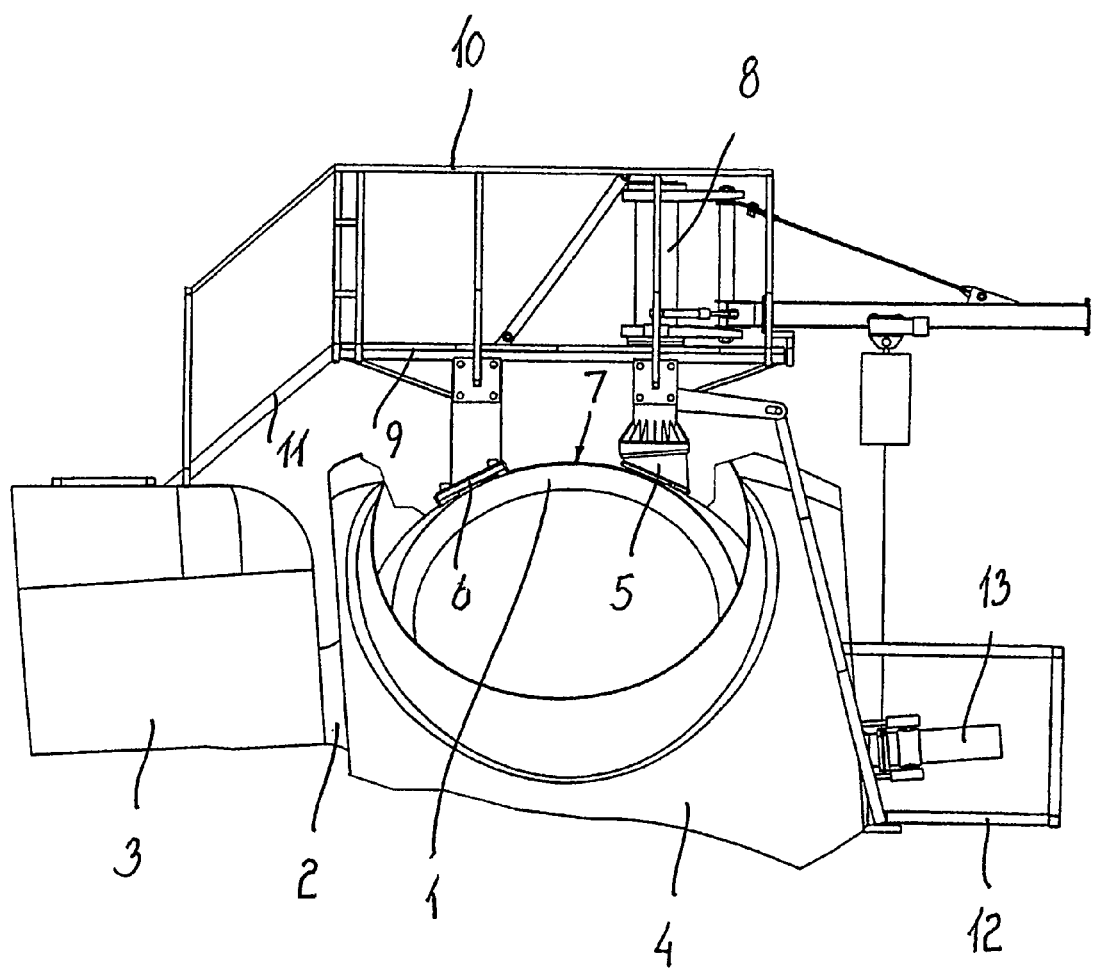
FIG. 1 is a plane view of equipment according to the invention mounted onto the hub of a wind turbine.

FIG. 1 shows how equipment to be used, when conducting service on the wind turbine, is placed, when the equipment is mounted on a hub 1. The hub 1 is mounted to the main shaft 2 of the wind turbine, and the main shaft 2 extends from the nacelle 3 of the wind turbine. The hub 1 is provided with an outer cap called the spinner 4, which, for the sake of clarity, in the figure is partly cut away in order to show the mounting of the equipment on the hub.

The equipment comprises different main parts. Primarily, a first connecting piece 5 and a second connecting piece 6 is secured to the surface 7 of the hub 1. The remaining parts of the equipment are secured to the connecting pieces so that all of the equipment via the two coupling elements is secured to the hub. The remaining parts of the equipment comprise a crane 8, a gangway 9 with guard rails 10, a ladder 11 leading from the nacelle 3 to the gangway 9 and a curb 12 mounted foremost on the hub 1 end being suspended from the crane 8.

The crane 8 is secured to the first connecting piece 5 such that an entirety of the crane 8 is positioned upwardly and/or outwardly relative to hub 1, and the gangway 9 is secured to the crane 8 and to the second connecting piece 6.

In the embodiment shown, the crane 8 is hoisting a hydraulic actuator 13 up to the hub 1 for replacement or for re-installation after formerly having been hoisted down for repair. Such hydraulic actuator 13 may weigh up to 250 kg. The entire torque from the equipment on the first connecting piece 5 must be absorbed by the securing of the first connecting piece 5 to the surface 7 of the hub 1. This sets extremely high demands to the securing of the first connecting piece 5 to the hub 1. That is why persons skilled in the art have come to the conclusions that it is not possible.

Figure 2:
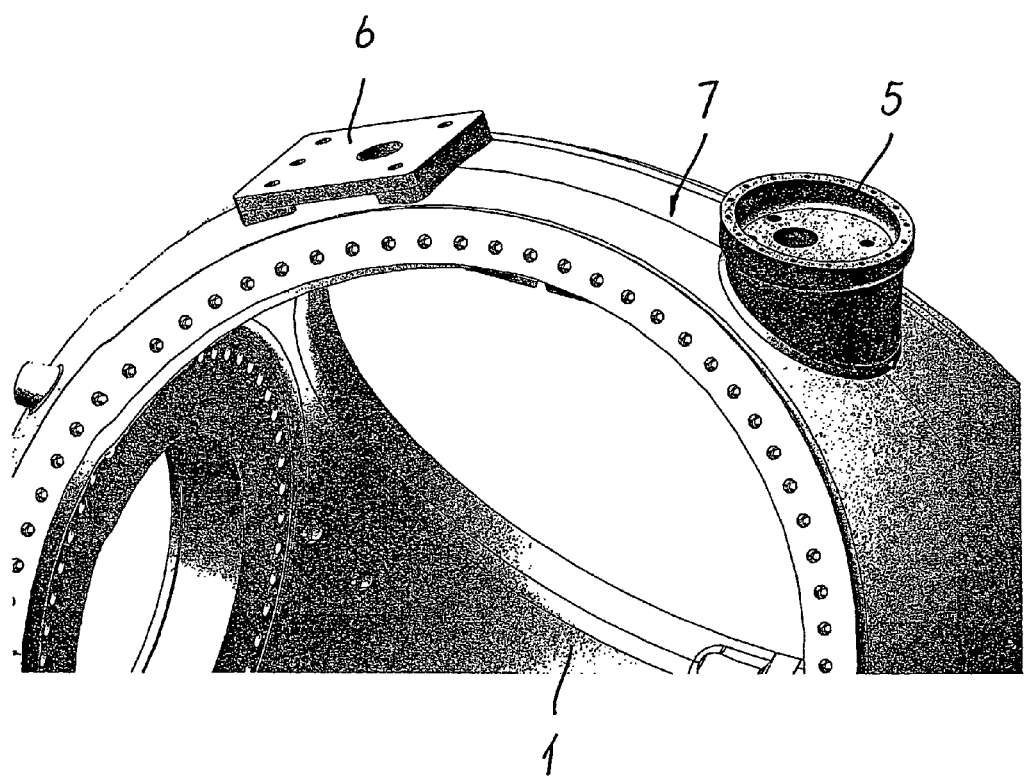
FIG. 2 is a perspective view of a hub for a wind turbine and with coupling elements mounted on the hub.

FIG. 2 is a perspective view of the first connecting piece 5 and the second connecting piece 6, when secured to the surface 7 of the hub 1. The first connecting piece 5 consists of a substantially cylindrical element, and the second connecting piece 6 consists of a plate-like element. In the embodiments shown, both the first connecting piece 5 and the second connecting piece 6 are secured to the surface 7 of the hub 1 in already existing and available mounting holes (not shown). The already existing and available holes are holes, which formerly have been used during erection and assembly of the wind turbine, when hoisting, by means of a mobile crane or raft-mounted crane, the hub from the ground to the main shaft and maintaining the hub in place during bolting of the hub to the main shaft. Thus, the holes for securing the first connecting piece and the second connecting piece to the surface of the hub are not initially provided for that purpose.

Figure 3:
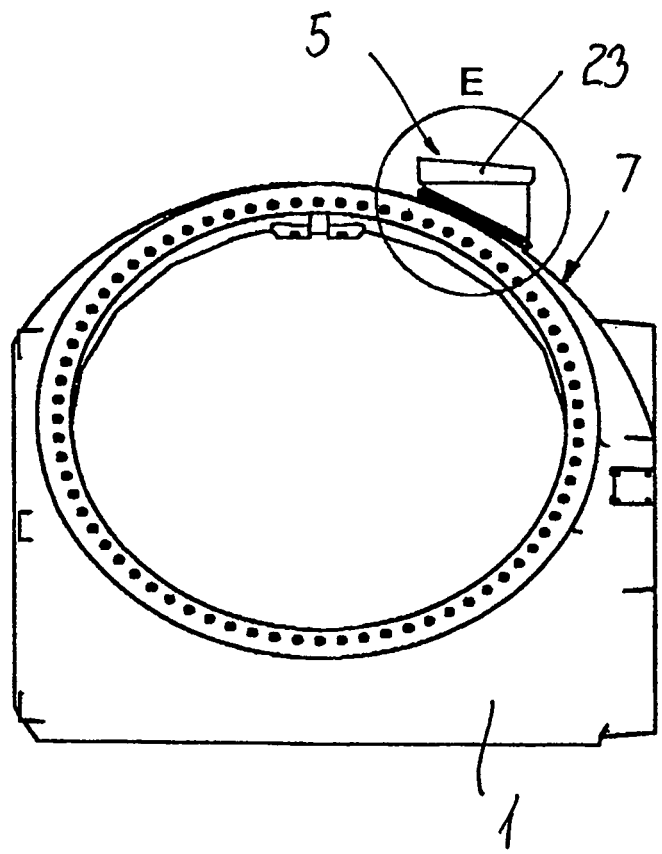
FIG. 3 is one plane view of a hub for a wind turbine and with one coupling element mounted on the hub.
Figure 4:
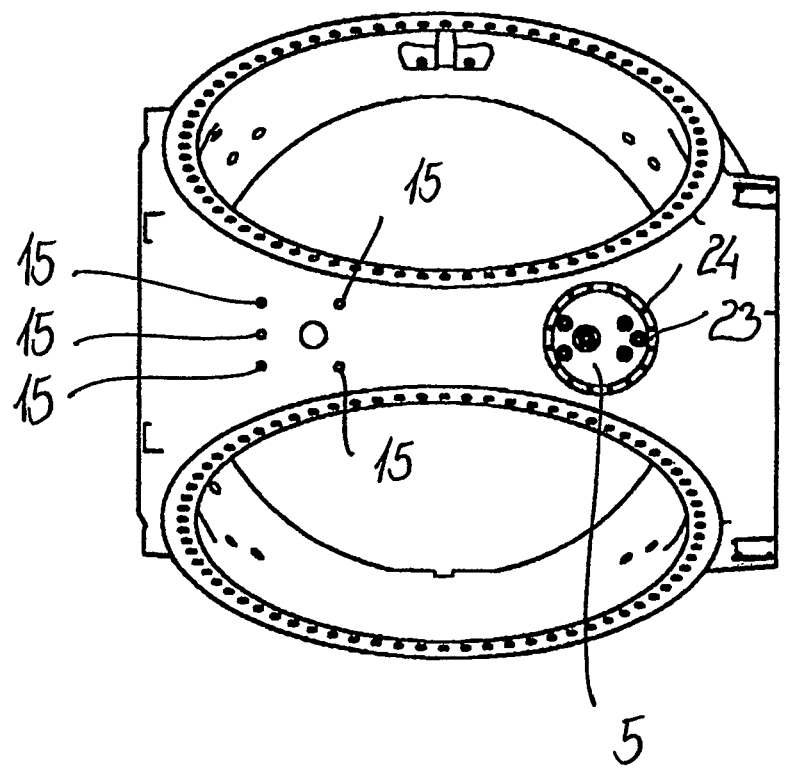
FIG. 4 is another plane view of a hub for a wind turbine and with one coupling element mounted on the hub.
Figure 5:
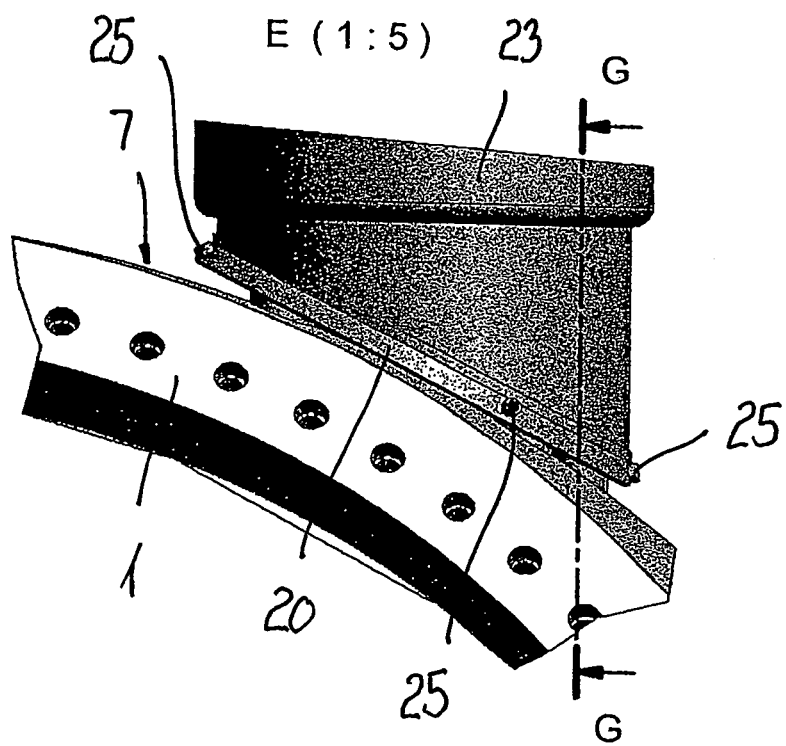
FIG. 5 is a perspective view of part of a hub for a wind turbine and with one coupling element mounted on the hub.
Figure 6:
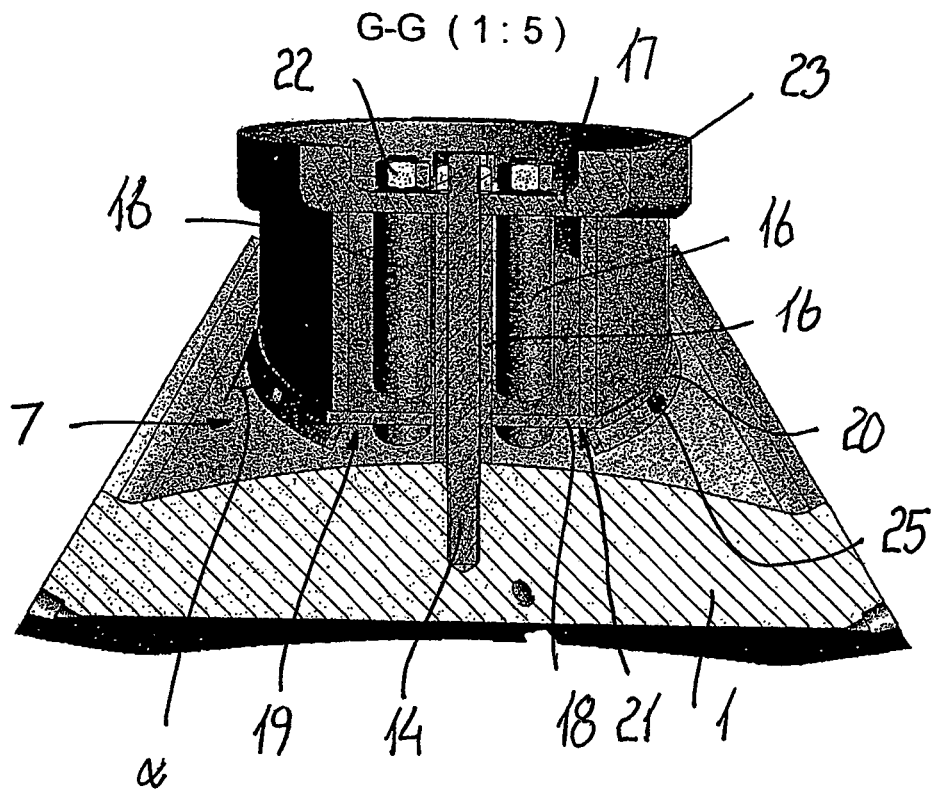
FIG. 6 is a perspective view of a cross section of a hub for a wind turbine and with a cross section of one coupling element mounted on the hub.

FIG. 3 and FIG. 4 are plane drawings, FIG. 5 is a perspective plane view and FIG. 6 is a perspective cross sectional view, all showing the first connecting piece 5, when being secured to the surface 7 of the hub 1. As can be seen, the surface 7 of the hub 1 is curved in the plane of the figure. Thus, the first connecting piece 5 must be able to adapt to the curvature of the surface 7 of the hub 1 in order to obtain a proper securing of the first connecting piece 5 to the hub. Only by achieving a proper securing will the first connecting piece 5 be able to hold the crane 8, even when the crane is lifting heavy appliances to the hub such as hydraulic actuators to be mounted inside the hub.

The first connecting piece 5 is provided with means for passing five bolts 14 through the connecting piece 5 from a top of the connecting piece 5 and to the threaded holes 15 already provided and available in the surface 7 of the hub 1. The bolts 14 extend through guiding liners 16 inside the first connecting piece 5, the guiding liners 16 extending from an upper internal disc-like structure 17 to a lower disc-like structure 18 and through the lower disc-like structure 18 into a bottom cavity 19 of the first connecting piece 5. The bottom cavity 19 is delimited by the lower disc-like structure 18 and by a lower flange 20 of the first connecting piece 5.

The bottom cavity 19 is intended for taking up of a cement-like substance (not shown) creating a physical connection between an under-side 21 of the lower disc-like structure 18 and the surface 7 of the hub 1. The cement-like substance is intended for creating a completely homogeneous connection between the surface 7 of the hub 1 and the first connecting piece 5. Because the surface 7 of the hub 1 is not worked more than absolutely necessary, when being manufactured, the surface 7 of the hub 1 is somewhat rough. If perhaps the first connecting piece had a concave surface being made of metal like the connecting piece itself and being congruent with the convex surface of the hub, the abutment between the concave surface of the first connecting piece and the convex surface of the hub would not be homogeneous, because of the rough surface of the hub.

However, introducing a cement-like substance into the cavity 19 made in the very bottom of the first connecting piece 5, the cement-like substance will fill out any unevenness of the rough surface 7 of the hub 1 and will also fill out the entire cavity 19 in the bottom of the first connecting piece 5. Thus, a complete congruent and homogenous abutment will be established between the underside 21 of the lower disc-like structure 18 and the surface 7 of the hub 1. This complete congruent and homogenous abutment is necessary in order for the first connecting piece to be able to carry the loads lowered or hoisted by the crane, without the risk of the crane tilting and breaking loose from the surface of the hub together with the first connecting piece. Preferred cement-like substances are substances from the Danish company Densit A/S, said substances being very hard and durable, although being workable when yet not cured.

Fitting of the first connecting piece 5 to the surface 7 of the hub 1 takes place by initially inserting a threaded end of the bolts 14 into the already available holes 15 in the surface 7 of the hub 1. The holes 15, as mentioned, are previously being made, when manufacturing the hub, and is, until now, only intended for hoisting, by means of a large crane, the hub from the ground to the mounting flange of the main shaft.

Subsequently to the insertion of the bolts 14 into the already available holes 15, the bolts 14 are fastened or nuts 22, as shown, at threaded other ends of the bolts 14 are fitted and fastened. Because the number of bolts 14 are limited to the number of already available holes 15, and because the holes 15, and thus the bolts 14, are situated quite close, the bolts 14 or the nuts 22 must be fastened quite much in order for the crane 8 to be able to hoist the sometimes heavy appliances to the hub 1. Eventually, the bolts 14 or nuts 22 are fastened up to 50% of the yield point of the bolts. Depending on the size of the already available holes 15, the bolts 14 may have different sizes, however a typical size being M30 bolts, i.e. having a diameter of 30 mm.

Alternatively to providing a congruent and homogeneous abutment between the often rather rough surface of the hub and the first connecting piece, the surface of the hub, onto which the first connecting piece is to be mounted, may be worked so that a smoother surface is established. This may establish the possibility of a bottom surface of the first connecting piece being a machined surface, being concave and being the abutment surface towards the surface of the hub in stead of a cement-like substance.

A flange 23 on the outer circumference of the first connecting piece 5 is provided with threaded holes 24 for securing by bolts (not shown) of the crane 8 to the first connecting piece 5. Therefore, a corresponding flange is provided on the crane (see FIG. 7).

The bottom flange 20 assisting in the establishment of the cavity 19 for the cement-like substance is provided with small bolts 25 extending through threaded holes (not shown) in the bottom flange 20. Because the bottom flange 20 is inclined an angle α, as shown, the bolts 25 are also inclined as shown, i.e. with the end of the blots extending into the cavity 19 and directed towards the bottom of the first connecting piece and towards the surface 7 of the hub 1.

The bolts 25 are not intended for further securing of the first connecting piece 5 to the surface 7 of the hub 1. The bolts 25 are intended for being tightened and thus being urged into the cavity 19. Because the end of the bolts extending into the cavity are inclined towards the bottom of the first connecting piece and towards the surface 7 of the hub 1, then, when tightening the bolts, the end of the bolts at one time during the tightening will meet the surface 7 of the hub 1. Further tightening of the bolts 25 will cause the first connecting piece 5 to raise itself from the surface 7 of the hub 1 and free the first connecting piece 5 from the hub 1, if the bolts 14 initially are loosened. This technique is used, when the first connecting piece 5 has been used for supporting the crane 8 and no longer is to be used, but has to be freed from the surface 7 of the hub 1 so that the wind turbine can come into operation again.

Figure 7:
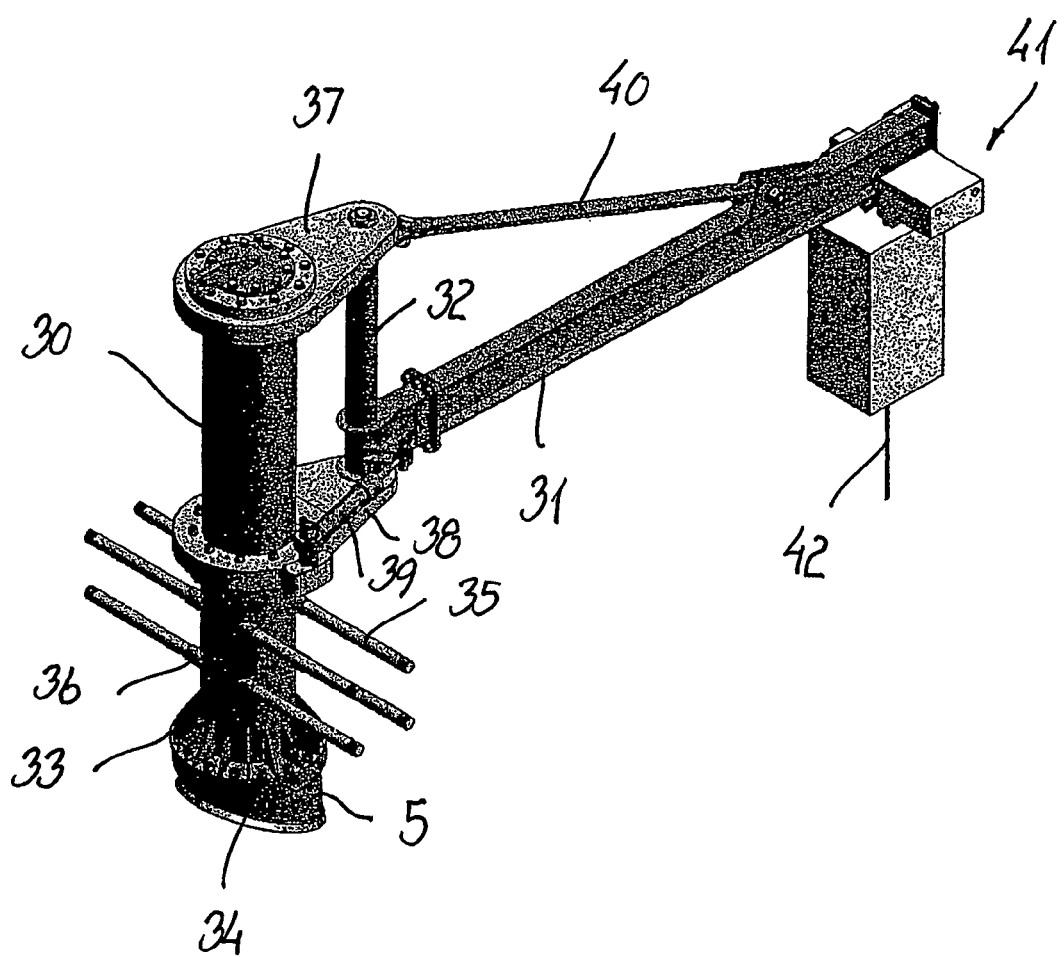
FIG. 7 is a perspective view of part of equipment according to the invention to be mounted on a hub of a wind turbine.
Figure 8:
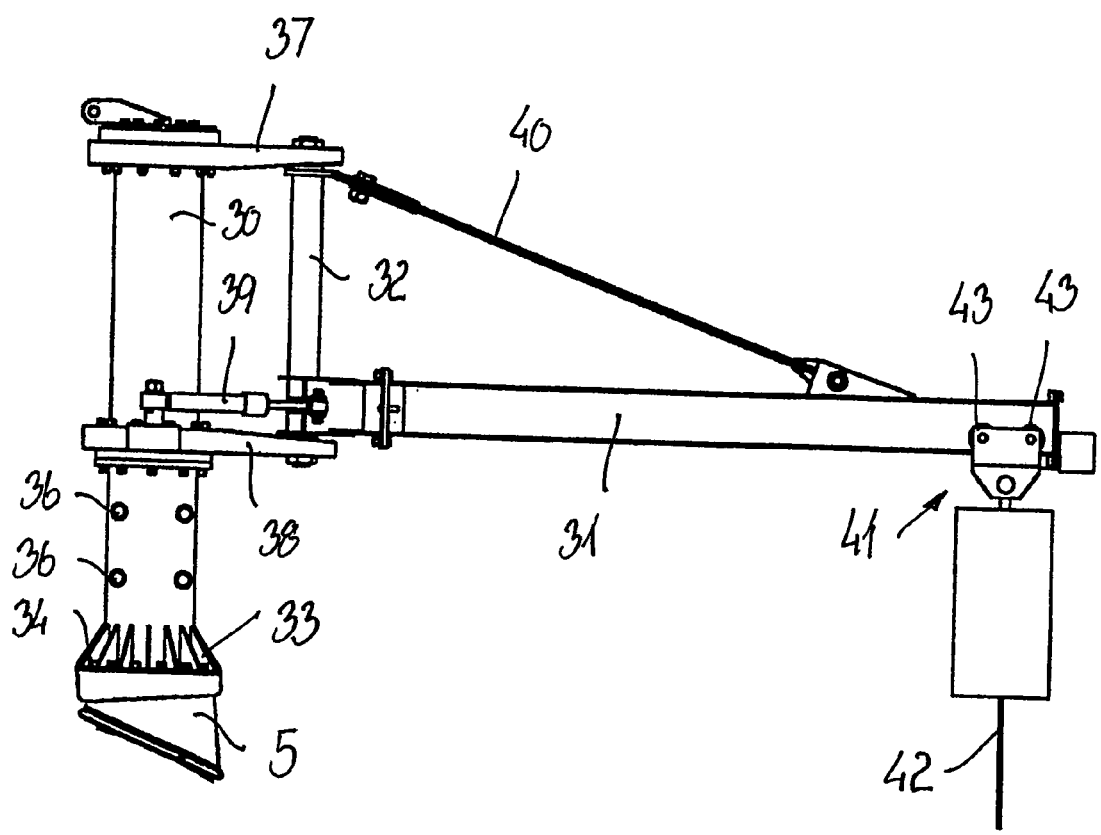
FIG. 8 is one plane view of the part of equipment according to the invention to be mounted on a hub of a wind turbine.
Figure 9:
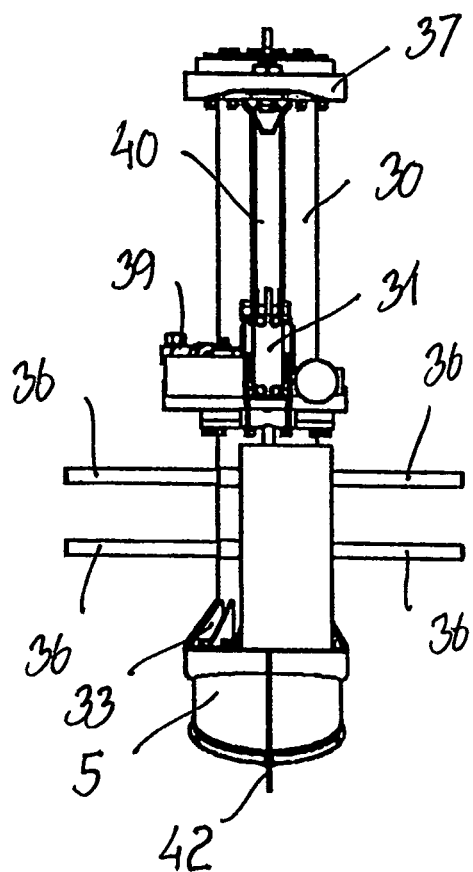
FIG. 9 is another plane view of the part of equipment according to the invention to be mounted on a hub of a wind turbine.
Figure 10:
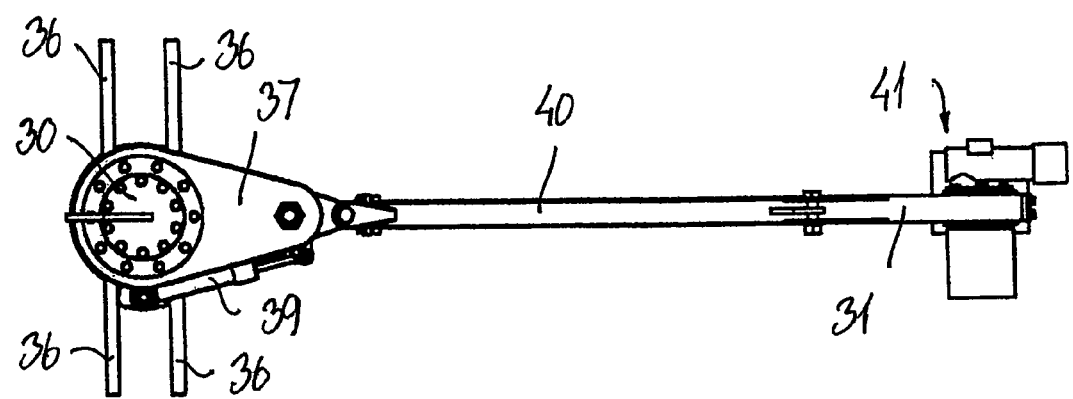
FIG. 10 is a third plane view of the part of equipment according to the invention to be mounted on a hub of a wind turbine.

FIG. 7 is a perspective view and FIG. 8, FIG. 9 and FIG. 10 are plane views of a crane 8 according to the invention. The crane 8 has a mast 30 and a jib 31, the jib 31 being connected to the mast 30 by a hinged connection 32. The mast 30 has a flange 33 intended for being secured to the flange 23 of the first connecting piece 5. A plurality of bolts 34 is provided for securing the crane 8 to the first connecting piece 5.

Above the flange 33 along the mast 30, four studs 35 extend outwards from the mast 30 on opposite sides of the mast 30. The studs 35 are intended for carrying the front-most part of the gangway (see FIG. 1). Preferably, the studs 35 are made of a material lighter than steel such as an aluminium alloy in order to reduce the overall weight of the crane 8. A preferred alloy is Alumec from Uddeholm Tooling having a module of elasticity being about ⅓ that of steel, but has rigidity being about the same as for steel. The studs 35 are mounted in bushings 36 provided in the mast 30. Thus, in the embodiment shown, the studs 35 consist of four studs in total extending trough the bushings 36 in the mast 30 and projecting on each side of the mast 30.

An upper link 37 and a lower link 38 are provided between the mast 30 and the hinged connection 32. Thus, the hinged connection 32 is provided at an outmost end of the links 37,38. The links 37. 38 are made from a material being very light in order to reduce the overall weight of the crane 8. The links 37,38 have a shape, resulting in the links 37.38 converging from a greater dimension at the mast 30 of the crane 8 to a smaller dimension at the hinged connection 32. In a preferred embodiment, the links are also made of a material being lighter than steel such as an aluminium alloy, preferably Alumec from Uddeholm Tooling having, as mentioned, a module of elasticity being about ⅓ that of steel, but having rigidity being equal to that of steel. Thus, the strength of the links is not compromised.

The jib 31 is made of a material being rigid enough to carry the load to be hoisted, but still being as light-weighted as possible in order to reduce the overall weight of the crane 8 and especially the weight contributing much to the torque applied to the first connecting piece. In a preferred embodiment the jib 31 is made of Alumec from Uddeholm Tooling. Between the lower link 38 and the jib 31 a hydraulic actuator 39 is provided. The hydraulic actuator 39 is intended for swivelling the jib 31 around the hinged connection 32 in relation to the links 37,38 and in relation to the mast 30 and the hub 1, onto which the crane 8 is mounted.

From an upper part of the hinged connection 32 and obliquely downward to an out-most end, although not outer-most end, of the jib 31, a brace 40 is inserted. The jib 31 is a so-called IPE-profile, and the lowering and hoisting means consists of a trolley 41 with a wire 42. The trolley 41 preferably has a set of two or more wheels 43 on each side of the jib 31. Thereby, the trolley 41 has the advantage of distributing the load along the length of the jib 31. Thereby, the jib 31 may be made using as little material as possible in relation to the weight to be lowered and hoisted by the wire 42 and thus in consideration of the total weight of the jib 31 and the crane 8.

In the embodiment shown, the outer-most point of the jib is situated in a distance from the crane mast centre of about 2.5 m.

The invention claimed is:

1. Equipment for servicing a wind turbine after a hub of the wind turbine has been mounted and fixed against rotation, comprising:
   a crane for lowering and hoisting wind turbine appliances from and to the hub; and
   connecting means for primarily removably securing the equipment, including the crane, to an upwardly facing region of a curved surface of the hub, and receiving substantially the entire load of the crane thereon, the connecting means having a lower surface adapted to conform to the generally upwardly facing curved hub surface,
   such that an entirety of the crane projects upwardly from the curved surface of the hub.

2. Equipment for servicing a wind turbine after a hub of a wind turbine has been mounted and fixed against rotation, said equipment comprising:
   a crane including a mast for lowering and hoisting wind turbine appliances from and to the hub, the crane having an end,
   wherein the end of the crane is adapted to removably attach to a generally upwardly facing region of a curved surface of the hub such that the load of the crane is received thereon, and an entirety of the crane extends upwardly from the hub,
   further comprising a connecting element adapted to be secured to the generally upwardly facing curved surface of the hub and project upwardly therefrom,
   the end of the crane and the connecting element adapted to be removably secured together.

3. Equipment for servicing a wind turbine after a hub of the wind turbine has been mounted, comprising:
   a crane for lowering and hoisting wind turbine appliances from and to the hub; and
   connecting means for removably securing the equipment, including the crane, to a surface of the hub such that the connecting means receives substantially the entire load of the crane thereon,
   wherein the connecting means comprises a substantially cylindrical element, the crane secured to the substantially cylindrical element,
   wherein the substantially cylindrical element is removably secured to the hub with bolts fastened in already available holes in the hub, the holes formerly used for hoisting the hub to a main shaft of the wind turbine.

4. The equipment of claim 3 wherein the crane is removably secured to the substantially cylindrical element with bolts.

5. Equipment for servicing a wind turbine after a hub of the wind turbine has been mounted, comprising:
   a crane for lowering and hoisting wind turbine appliances from and to the hub; and
   connecting means for removably securing the equipment, including the crane, to a surface of the hub such that the connecting means receives substantially the entire load of the crane thereon,
   wherein the equipment further comprises a gangway, and wherein the connecting means comprises a substantially cylindrical element and a plate-like element, the crane secured to the substantially cylindrical element and the gangway secured to the plate-like element,
   wherein the substantially cylindrical element and the plate-like element are removably secured to the hub with bolts fastened in already available holes in the hub, the holes formerly used for hoisting the hub to a main shaft of the wind turbine.

6. The equipment of claim 5 wherein the crane and the gangway are removably secured to the substantially cylindrical element and the plate-like element, respectively, with bolts.

7. Equipment for servicing a wind turbine after a hub of the wind turbine has been mounted and fixed against rotation, comprising:
- a crane for lowering and hoisting wind turbine appliances from and to the hub, the crane having an end; and
- connecting means for removably securing the equipment, including the crane, to a surface of the hub such that the connecting means receives substantially the entire load of the crane thereon, the connecting means adapted to be secured to an external surface of the hub and project outwardly therefrom,
- the end of the crane and the connecting means adapted to be removably secured together such that an entirety of the crane projects outwardly from the external surface of the hub.

8. The equipment of claim 7 wherein the connecting means comprises a substantially cylindrical element, the crane secured to the substantially cylindrical element.

9. The equipment of claim 7 wherein the equipment further comprises a gangway, and wherein the connecting means comprises a substantially cylindrical element and a plate-like element, the crane secured to the substantially cylindrical element and the gangway secured to the plate-like element.

10. Equipment for servicing a wind turbine after a hub of the wind turbine has been mounted, comprising:
- a crane for lowering and hoisting wind turbine appliances from and to the hub; and
- connecting means for primarily securing the equipment, including the crane, to an upwardly facing region of a curved surface of the hub, and receiving substantially the entire load of the crane thereon, the connecting means having a lower surface adapted to conform to the generally upwardly facing curved hub surface,
- further comprising fastening means for securing the equipment to already available holes, said holes formerly used for hoisting the hub to a main shaft of the wind turbine.

11. The equipment according to claim 10, where connecting means comprises a first connecting piece configured to be secured to the curved surface of the hub in a first set of already available holes.

12. The equipment according to claim 11, wherein the equipment is provided with a second connecting piece configured to be secured to the generally upwardly facing curved surface of the hub in a second set of already available holes.

13. The equipment according to claim 12, wherein the second connecting piece is configured primarily for securing a gangway, constituting part of the equipment, to the hub.

14. The equipment according to claim 11, wherein the first connecting piece is configured primarily for securing a crane, constituting part of the equipment, to the hub.

15. The equipment according to claim 14, wherein said crane comprises primary holes for inserting bolts for securing the crane to the connecting piece and thus to the hub.

16. The equipment according to claim 15, wherein the jib has an I-shaped cross section or an inverted T-shaped cross-section and wherein wheels of a trolley are configured to be supported on a transversal part of a profile.

17. The equipment according to claim 15, where the crane is provided with a jib connected to a mast of the crane, and said jib being swivable around a substantially vertical hinged connection and said jib extending outwards in relation to the mast and forwards in relation to a direction being a forwards direction of the wind turbine when the crane is secured to the hub.

18. The equipment according to claim 17, where links are provided between the mast and the hinged connection, said links extending outwards in relation to the mast and forwards in relation to a direction being a forward direction of the wind turbine when the crane is secured to the hub.

19. The equipment according to claim 18, where the links have a greater dimension at an end where the links are attached to the mast and have a smaller dimension at an end where the jib by means of the hinged connection is attached to the links.

20. The equipment according to claim 18, wherein the links are made of a material less dense than steel.

21. The equipment according to claim 11, wherein said connecting piece for connecting the hub with the remainder of the equipment being provided with primary holes for inserting bolts to be secured to the existing holes in the hub and thereby securing the connecting piece to the hub, and said connecting piece also being provided with secondary holes for inserting bolts for securing the remainder of the equipment to the connecting piece.

22. The equipment according to claim 21, wherein the connecting piece is provided with means for releasing adherence by a cement-like structure of the connecting piece to the hub.

23. The equipment according to claim 21, wherein the connecting piece comprises a flange extending circumferentially along the connecting piece, said flange being provided with means for securing the remainder of the equipment to the connecting piece.

24. The equipment according to claim 21, wherein the connecting piece is provided with an upper disc-like member and where guiding liners for bolts extend between the upper disc-like member and lower disc-like members.

25. The equipment according to claim 24, wherein the guiding liners are positioned relative to each other in the connecting piece corresponding to a positioning of already available holes in the hub of the wind turbine.

26. The equipment according to claim 21, where a cavity is formed in a bottom of the connecting piece, said cavity being configured for containing a cement-like substance when the connecting piece is secured to the hub for conforming to the curved hub surface.

27. The equipment according to claim 26, where the cavity is delimited by a collar extending circumferentially along the bottom of the connecting piece, and said collar limiting any flow from the cavity of the cement-like substance.

28. The equipment according to claim 26, wherein the cavity is delimited by a disc-like member extending inside the connecting piece, and said disc-like member limiting any flow from the cavity of the cement-like substance.

* * * * *